May 17, 1966  M. E. MOHSIN  3,251,633
CONTROLLED FLUID LUBRICATED BEARINGS
Filed Feb. 13, 1963  2 Sheets-Sheet 1
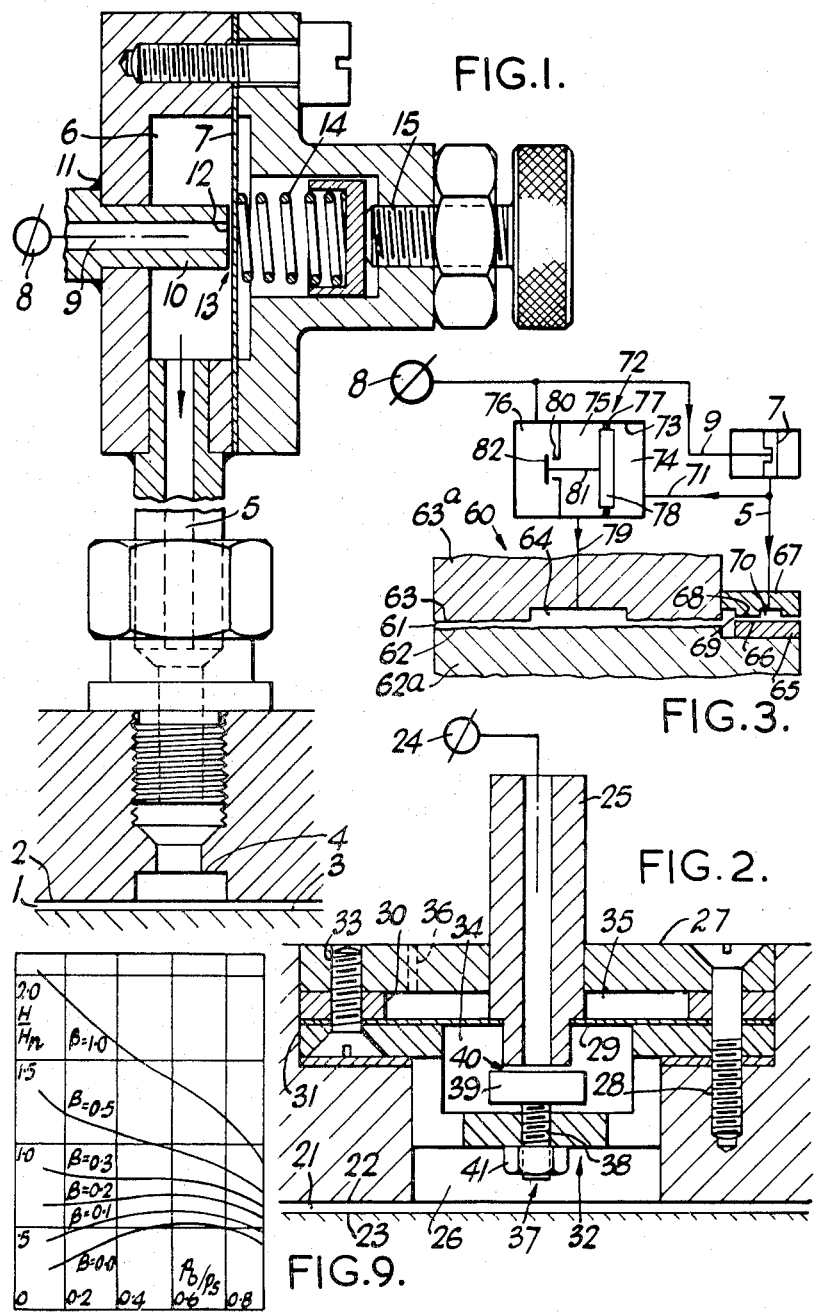

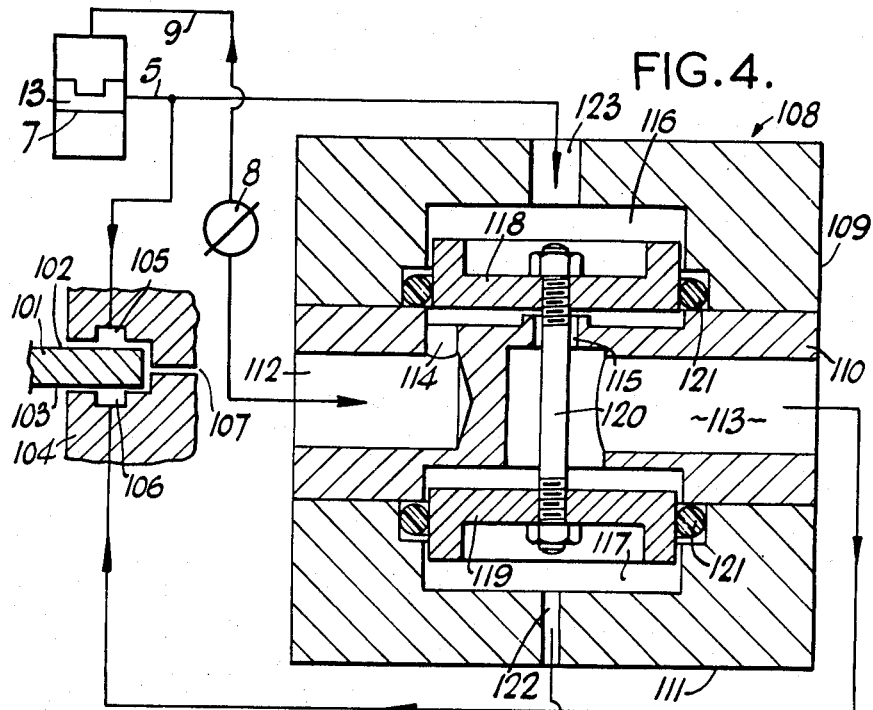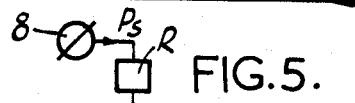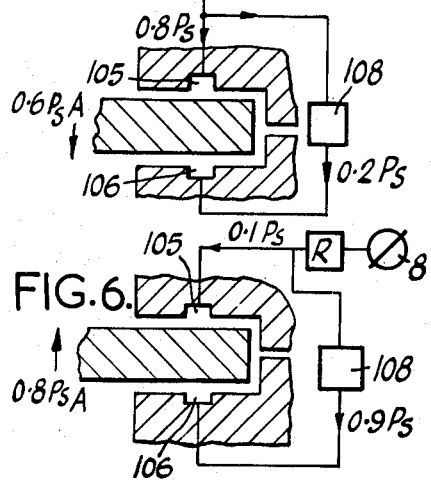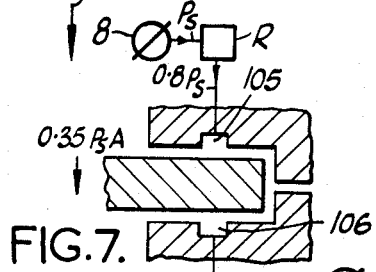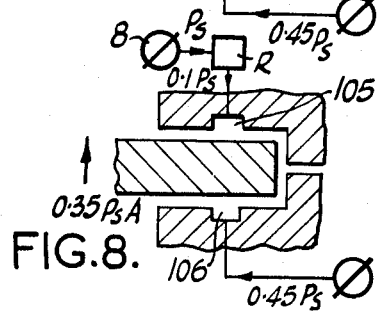

United States Patent Office 3,251,633
Patented May 17, 1966

3,251,633
CONTROLLED FLUID-LUBRICATED BEARINGS
Mohamed Ezzat Mohsin, Blackley, Manchester, England, assignor to National Research Development Corporation, London, England, a corporation of Great Britain
Filed Feb. 13, 1963, Ser. No. 258,285
Claims priority, application Great Britain, Feb. 16, 1962, 6,188/62
14 Claims. (Cl. 308—5)

Fluid-lubricated bearings show negligible friction and can support considerable loads. For these and other reasons they are now being considered for more and more uses especially on machine tools where they may offer many advantages over conventional bearings when used between the tool slides and the bodiees that run upon them.

However, conventional fluid-lubricated bearings have generally exhibited poor stiffness; that is to say, the thickness of the layer of lubrication between the bearing members varies too greatly on change of load. If hydrostatic bearings are to work with satisfactory precision under high loads in the automatic machine tools now contemplated, the stiffness characteristics of these bearings must be improved.

Some attempts have already been made to improve the stiffness of the type of fluid bearing in which fluid at a supply pressure $P_s$ enters a constant resistance $R_1$ and passes through it to the bearing clearance. The latter offers a resistance $R_2$ to the passage of fluid through it. The pressure of the fluid just upstream of the clearance may be designated $P_b$. For such a bearing $R_2$ varies substantially with the pressure $P_b$ which is indicative of the load on the bearing. In these attempts the quantity of fluid flow through the bearing has been controlled so as to counterbalance the changes in $P_b$ caused by the fluctuation of the load and so to keep $R_2$ and thus the bearing clearance constant. The control has usually been exercised by a spool valve through which the flow of lubricant passes. In one system invented by Dr. J. K. Royle (the subject of British Patent No. 906,818), $R_1$ is constant while the pressures $P_b$ and $P_s$ are applied in opposition to each other upon a spool valve in which the spool moves under their influence to regulate the supply of fluid so that $P_b/P_s$ remains constant. $R_2$ and the bearing clearance must therefore remain constant also. Spool valves unfortunately show undesirable characteristics such as static friction between the spool and its casing, leakage of fluid past the spool and poor dynamic response. What is now needed is a fluid bearing wherein changes of load can be detected swiftly and positively and the amount of lubricant flow adjusted appropriately by means that do not suffer substantially from static friction and other disadvantages of the known spool valves.

I believe my invention covers such a bearing. My invention is applicable to fluid bearing systems in which the rate of flow of fluid from a source to a point of use is regulated, by means of a variable resistance, so as to maintain the pressure of the fluid at the point of use at a desired value. My invention therefore applies not only to fluid bearing systems in which $R_1$ is changed in such a manner as to keep the lubricant flow directly proportional to the pressure $P_b$, and hence to keep $R_2$ constant, but also to bearings in which it is desired to control this flow in other ways, for instance to maintain $P_b$ equal to or some multiple of some other variable pressure or to maintain it equal to the sum of or difference between two other pressures. The scope of my invention is defined by the appended claims, and various forms of apparatus according to it will now be described to illustrate it, with reference to the accompanying drawings in which:

FIG. 1 is a section through a hydrostatic bearing controlled so that the bearing clearance is constant irrespective of varying load;

FIG. 2 is a section through another hydrostatic bearing of the same type;

FIG. 3 is a section through two associated hydrostatic bearings, the flow of fluid through the first being so regulated as to maintain the clearance constant, while the flow of fluid through the second is regulated to maintain equal pressures at the recesses of both bearings;

FIG. 4 is a section through a hydrostatic bearing with two recesses acting against opposite faces of a slab, in which the sum of the pressures at the two recesses is to be maintained equal to another pressure;

FIGS. 5 to 8 are schematic and illustrate the advantages of a bearing according to FIG. 4, and FIG. 9 is a graph illustrating an analysis of the working of bearings according to FIG. 1 or FIG. 2.

The clearance 1 of the bearing shown in FIG. 1 is defined by two opposed plane surfaces 2 and 3. A bearing recess 4 is formed in the surface 2 and communicates by way of a conduit 5 with a chamber 6 bounded on one side by a flexible obstruction, namely a metal diaphragm 7. A source of fluid at constant pressure, represented diagrammatically at 8, communicates with the chamber 6, by way of a conduit 9. Conduit 9 is rigidly fixed at 11 to the body of the chamber 6, and terminates in a hollow spigot 10 which projects into the chamber so that the spigot's annular end face 12 is separated by a variable orifice—a gap 13—from the diaphragm 7. The face of the diaphragm remote from the chamber 6 bears against a low stiffness spring 14 adjustable by means of a set screw 15. The function of this spring is to regulate the initial height $G_0$ of the gap 13 when the pressure $P_b$ of the fluid in the recess 4 = 0, according to the analysis that follows shortly. The spring 14, being of low stiffness, does not contribute appreciably to the loading upon the diaphragm which depends mainly upon its stiffness and the forces exerted upon it by the various fluids.

When the bearing is put into use, provided the stiffness of the diaphragm 7 is matched with the dimensions of the spigot 10 and initial height $G_0$ of the gap 13 according to the following analysis, it has been found possible to maintain the clearance constant, within ±5% of its nominal value, for values of $P_b$ ranging between 0.1 and 0.8 of the constant supply pressure. Any alteration of the load upon the bearing will change $P_b$ and accordingly tend to change the height of the clearance 1. Increase of load will tend to diminish the height and so raise $P_b$ and vice versa. But should $P_b$ rise in chamber 6, the extra force exerted by the fluid on the diaphragm will widen the gap 13 and so increase the lubricant flow to the bearing to keep its clearance 1 constant. The diaphragm comes to rest in a position in which it defines a wider gap 13 than before. Should the load on the bearing fall, the opposite process takes place; that is to say, the diaphragm 7 caves into the chamber 6 narrowing the gap 13 and decreases the lubricant flow to the bearing in such a manner as always to keep the bearing clearance 1 constant.

The operation just described has been set forth as a sequence. It is of course essential that response should be quick enough to prevent variations of the gap becoming so great or continuing for so long as to introduce errors into the working of the system of which the bearing forms part.

An alternative construction of bearing is shown in FIG. 2. The bearing clearance 21 is defined by the plane surfaces 22 and 23. Fluid from a constant pressure course 24 is fed through a cylindrical conduit 25 to a recess or chamber 26 formed in the surface 22 and escapes from the recess through the clearance 21.

The conduit 25 makes a loose sliding fit within a hole drilled through a disc 27. This disc is anchored relative to the surface 22 by a screw 28. Conduit 25 also passes centrally through a flexible obstruction, namely an annular diaphragm 29, and is bonded to it. The periphery of the diaphragm is secured between a packing ring 30 and the flange 31 of a supporting plate 32; the ring and the plate are both anchored relative to the surface 22 by the screw 28 and to the disc 27 by a screw 33. The diaphragm 29 thus divides the recess or chamber 26 into two parts 34 and 35 sealed from each other, and the part 35 communicates with the atmosphere through passages 36 drilled in the disc 27. Because of its loose fit within the disc 27 and the flexibility of the diaphragm 29, the conduit 25 may make limited axial movement relative to the recess 26. The middle part of the supporting plate 32 is dished and perforated, and a valve member 37 having a threaded shank 38 and a circular head 39 screws into the middle of the plate 32 so that the shank 38 lies coaxial with the conduit 25. A variable orifice, that is to say a variable gap 40, is thus made between the mouth of the conduit 25 and the head 39. This gap can be set as desired before the bearing starts to work, and the relative positions of conduit 25 and head 39 can then be fixed by screwing tight a lock nut 41.

It will be apparent that the bearings of FIGS. 1 and 2 work similarly. The following analysis is suggested of their working.

In the analysis symbols given in the following table will be used. Where two numbers in brackets follow any feature or piece of apparatus named in the table they are the reference numerals by which that piece of apparatus is identified in FIGS. 1 and 2 respectively.

Table I

| Symbol | Feature or Apparatus | Units |
| --- | --- | --- |
| $c$ | Diaphragm compliance (central deflection per unit pressure). | In.³/lb. |
| $G$ | Instantaneous height of gap (13, 40). | In. |
| $G_0$ | Initial height of gap (13, 40) when $P_b=0$. | In. |
| $H$ | Instantaneous height of clearance (1, 21). | In. |
| $H_n$ | Nominal height of clearance (1, 21). | In. |
| $K_b$ | Resistance constant for the clearance (1, 21) = $R_b \cdot H^3$. | Lb.sec./in.². |
| $K_r$ | Resistance constant for the gap (13, 40) = $R_r \cdot G^3$. | Lb.sec./in.². |
| $P_b$ | Bearing pressure, i.e. pressure of fluid in the recess (4, 26). | Lb./in.². |
| $P_s$ | Constant supply pressure of source (8, 24). | Lb./in.². |
| $Q$ | Lubricant Flow. | In./sec. |
| $R_b$ | Hydraulic resistance of clearance (1, 27). | Lb.sec./in.⁵. |
| $R_r$ | Hydraulic resistance of gap (13, 40). | Lb.sec./in.⁵. |
| $\alpha$ | Design constant of gap (13, 40). | Dimensionless. |
| $\beta$ | Design constant of clearance (1, 21). | Dimensionless. |
| $\delta$ | Diaphragm central deflection. | In. |
| $\eta$ | Arbitrary design constant relating to gap (13, 40). | Dimensionless. |

Table II

When the bearing pressure is equal to atmospheric ($P_b=0$), then the height of the gap (13, 40) will be $G_0$. When in use the bearing pressure becomes $P_b$, $G_0$ will change to $G$ where $$G = G_0 + \delta$$

The resistance of the gap (13, 40) will be:

$$R_r = \frac{K_r}{(G)^3} = \frac{K_r}{(G_0+\delta)^3}$$

Also $$R_r = R_b\left(\frac{P_s}{P_b}-1\right) = \frac{K_b}{H^3}\left(\frac{P_s}{P_b}-1\right)$$

Then, $$\frac{1}{\left(\frac{P_s}{P_b}-1\right)} = \frac{K_b}{K_r}\left[\left(\frac{G_0}{H}\right)+\left(\frac{\delta}{H}\right)\right]^3 \quad (1)$$

$c$ being the diaphragm compliance defined as the central deflection per unit pressure, then:

$$\delta = cP_b$$

Now the value of $c$ must satisfy the equation $$\frac{c}{H_n} = \frac{\eta}{P_s}$$

where $\eta$ is a design dimensionless arbitrary constant, Thus $$\frac{\delta}{H_n} = \eta \frac{P_b}{P_s} \quad (2)$$

From (1) and (2), then:

$$\frac{1}{\left(\frac{P_s}{P_b}-1\right)} = \left(\frac{H_n}{H}\right)^3 \cdot \left(\frac{K_b}{K_r}\right) \cdot \left[\left(\frac{G_0}{H_n}\right)+\eta\frac{P_b}{P_s}\right]^3$$

If $$\frac{K_b}{K_r} = \frac{\alpha}{\eta^3} \text{ and } \frac{G_0}{H_n} = \beta\eta$$

where $\alpha$ and $\beta$ are two further constants, then:

$$\frac{1}{\left(\frac{P_s}{P_b}-1\right)} = \left(\frac{H_n}{H}\right)^3 \cdot \alpha\left[\beta+\frac{P_b}{P_s}\right]^3 \quad (3)$$

From Equation 3 an expression equating $H/H_n$ to a function of $\alpha$, $\beta$, $P_s$ and $P_b$ may be derived. In our experiments using bearings as shown in FIG. 1 to separate a flat and rectangular bottomed block from a flat surface beneath it, the surface area of the bearing was 3 x 11 inches, and $P_s$ was 120 lb./sq. in. The diaphragm 7 was a spring steel disc, 1 inch in diameter and 0.022 inch thick. The outside diameter of the spigot 10 was 0.252 inch and the inside diameter 0.231 inch. The bearing responded effectively over a range of loadings calling for $P_b$ to vary from 0.1 $P_s$ to 0.8 $P_s$—i.e. from 12 to 100 lb./sq. in. For apparatus with such dimensions the constants $\eta$ and $\alpha$ were unity and 3.5 respectively. Using this value of $\alpha$ and Equation 3 to plot $H/H_n$ against $P_b/P_s$ for different values of $\beta$ in the graph shown in FIG. 9, it will be seen that when $\beta=0.2$ $H/H_n$ remains most nearly constant for values of $P_b/P_s$ between 0.1 and 0.8. This value of constant $\beta$ was therefore chosen; since $G_0/H_n=\beta$ and $\eta$ equalled unity, it therefore followed that the initial height of the gap 13 was about one-fifth the nominal height of the clearance 1.

My experiments are described in a paper presented by the inventor at the Third International Conference of Machine Tool Design and Research, Birmingham, England, September 24–28, 1962. The paper is now in course of publication in "International Journal of Machine Tool Design and Research."

FIG. 3 shows a hydrostatic bearing to which this invention is applied in a different way. The clearance 61 of the bearing 60 to which the invention is now applied is defined by the opposed surfaces 62, 63 of two bearing members 62a, 63a respectively. The bearing recess 64 is formed in the surface 63. The surfaces 62, 63 are only roughly finished, so that it is not possible accurately to define the height of the clearance 61 due to this or due to any other reason such as structural deflections. Mounted on the member 62a to the side of the clearance 61 is a long narrow bar 65 with an accurately flat surface 66. Mounted on the member 63a so as to register directly above the bar 65 is another bar 67, with an accurately flat surface 68. The two bars 65, 67 constitute the two members of a second bearing and define between them a clearance 69. A bearing recess 70 is formed in the surface 68. The two members of each of the two bearings are intended to move relative to each other in a direction perpendicular to that of the paper, and the two recesses 64, 70 are channel shaped with their length in the same direction.

The second bearing is of the type illustrated in FIG. 1, and the source 8, conduits 5 and 9, and diaphragm 7 are represented very diagrammatically in FIG. 3. A tapping 71 from the conduit 5 leads to a regulator 72 by which the flow of fluid from the source 8 to the recess 64 of the bearing 60 is so controlled that the pressures at recesses 64 and 70 are maintained equal. Under variations of load, the pressures at the recesses 64, 70 will be controlled to maintain the clearances 61, 69 constant in a similar way to that in which constant clearance was maintained by the bearings shown in FIGS. 1 and 2. In addition, if inaccuracy of the faces 62, 63 causes a change in the clearance 61, as shown in FIG. 3 is capable of compensating action. For instance, if the inaccuracy results in increase of the clearance 61, the pressure at recess 64 will fall, so causing the inaccurate faces 62, 63 to move together. This will cause the two accurate faces 66, 68 to move together also, thus diminishing the clearance 69, and $P_b$ will therefore rise and the regulator 72 will bring about a corresponding rise in the pressure at recess 64 to force the faces 62, 63 apart again until the clearance 69 is again of the required height.

The regulator 72 comprises a cylinder 73 divided into three chambers 74, 75 and 76, and the tapping 71 feeds chamber 74. The wall common to the chambers 74 and 75 constitutes the flexible obstruction of the bearing 60 and includes a metallic disc 78. The metallic disc 78 is separated from the walls of the cylinder 73 by a resilient O-ring or equivalent rubber seal 77, the fit of which is such that for the slight movements made by the disc 78 during operation of the valve there is no true rolling or sliding of the rubber seal or O-ring 77 relative to the parts it contacts but only a slight shearing. The disc 78 and seal 77 together constitute a diaphragm with a minutely small stiffness. The chamber 75 communicates by a passage 79 with the recess 64. Thus if the fluid pressures at clearances 61 and 69 are equal the pressures in chambers 74 and 75 will be equal also and the disc 78 may be at rest. The opposite wall of the chamber 75 has an aperture in the middle, this aperture having a raised edge 80 within chamber 76. A stem 81 anchored at one end to the disc 78 passes through the aperture and a small metal disc 82 is mounted on the stem 81. The chamber 76 is connected to the source 8, and disc 82 and raised edge 80 define between them the variable bearing orifice whereby the pressure of the fluid supplied to the recess 64 may be reduced in passage from 76 to 75 from $P_s$ to the instantaneous pressure within the chamber 74. Should the pressure in 74 rise relative to that in 75, disc 78 will move towards 75, shearing the rubber seal 77, so parting the plate 82 and edge 80 and tending to lessen the pressure drop as fluid passes between them. Should the pressure in 74 drop relative to that in 75, the disc 78 will move the opposite way with corresponding opposite effect. The small area of the aperture between 75 and 76 ensures a very small force difference on the small disc 81. This results in only a very small difference between the pressures acting on the two sides of the disc 82. For practical purposes the only forces acting upon the disc 78 are those of the fluids that directly contact its two faces.

The bearings hitherto described are suitable for use when positive loads force two bearing members together, but not when negative loads tend to pull them apart. FIGURE 4 shows an example of the application of my invention to a bearing that can withstand both types of load. One of the bearing members, 101, is a slab with parallel faces 102, 103. The other of the bearing members, 104, has a channel formed in it with bearing recesses 105, 106 in the opposite walls of the channel. The edge of the member 101 fits within the channel so that pressure fluid issuing from recess 105 may bear against face 102 and fluid from recess 106 against face 103. An outlet 107 ensures that the fluids fed to recesses 105, 106 do not mix. Surface 102 and recess 105 form parts of a bearing of the type shown in FIG. 1, being supplied from a constant pressure ($P_s$) source 8 by way inter alia of conduit 9, diaphragm 7, gap 13 and conduit 5, all such parts being shown very diagrammatically. Fluid is fed to the recess 106 at a pressure equal to the difference between $P_s$ and the pressure of the fluid at the recess 105.

A pressure of this latter value is achieved by means of a valve 108 comprising three rectangular blocks 109, 110 and 111 mounted one on top of the other. Two blind holes 112 and 113 are drilled in the middle block 110 from opposite ends. Communicating apertures 114, 115 are formed between each of these two holes and a cylindrical cavity 116 formed in the top block 109. The hole 113 also communicates with a cylindrical cavity 117 formed in the bottom block 111. Cavity 117 is coaxial with and of the same bore as the cavity 116. Two discs 118, 119 move within cavities 116, 117 respectively and are mounted on a common shaft 120. These discs are separated from the walls of their respective cavities by resilient O-rings 121, the fit of which is such that for the slight movements made by the discs during operation of the valve there is no true rolling or sliding of the O-rings relative to the parts they contact but only a slight shearing. The bottom of cavity 117 communicates with a drain via an outlet 122, the top of cavity 116 with the conduit 5 via an inlet 123, the hole 112 with the source 8 and the hole 113 with the recess 106. The two discs 118, 119, with their corresponding O-rings 121, act as diaphragms of very small stiffness, and the disc 119 and its corresponding O-ring constitute the flexible obstruction of the bearing according to this invention of which 106 is the recess and the variable orifice is defined by the bottom face of the disc 118 and the raised upper edge of the aperture 115. This orifice determines the pressure drop between the pressure in hole 112 ($P_s$) and that in recess 106 and hole 113 ($P_1$). While the valve 108 is working outlet 122 is at zero pressure and inlet 123 at pressure $P_b$. Therefore assuming equal area ($a$) of all four disc faces the net upward force on the shaft 120 will be $a.\text{zero}+a.P_s$, and this will balance the net downward force of $a.P_b+a.P_1$. Therefore $a.P_s=a.P_b+a.P_1$ or $P_1+P_b=P_s$. To be perfectly true this requires that the cross-section of the shaft 120 shall be zero, that $P_s$ shall have access to the entire underside of disc 118 and that no fluid at pressure $P_1$ shall find access to the underside of that disc by way of aperture 115. Of course these requirements cannot exactly be met, but it is possible by good design to meet them very nearly so that $P_s=P_1+P_b\pm3\%$.

By ensuring that the discs 118, 119 shear the O-rings 121 without sliding or rolling against them the traditional spool valve problems of static friction, leakage etc. are avoided. Diaphragms could be substituted for the discs and discs, suitably loaded, could be substituted for the diaphragms already described with reference to FIGS. 1 and 2.

The advantages of using an adding valve such as 108 in a hydrostatic bearing as shown in FIG. 4 are made apparent in FIGS. 5 to 8. FIGS. 7 and 8 show a similar bearing, controlled in a conventional way and supporting its maximum positive and negative loads. Fluid at $P_s$ from a pressure source 8 is fed through a regulator R (intended to work to the same effect as my apparatus shown in FIG. 1) to recess 105. This fluid may issue from the regulator at any pressure within the range of, say, 0.1 $P_s$ to 0.8 $P_s$. Fluid at constant pressure, say 0.45 $P_s$, is fed to the recess. If the area of each bearing surface is A, then the maximum positive load the bearing can take is $(0.8P_s-0.45P_s)A$, and the greatest negative load $(0.1P_s-0.45P_s)A$. The bearings therefore operate only for loads falling within the range $\pm 0.35P_s.A$. However if recess 105 is fed with fluid at pressure within the range 0.1$P_s$ to 0.8$P_s$, and recess 106 is supplied via our valve 108 with fluid at a pressure equal to the difference between $P_s$ and the instantaneous pressure in recess 105 the maximum positive load the bearing can take (FIG. 5) is $A(0.8P_s-(P_s-0.8P_s))=0.6P_sA$, and the greatest negative load (FIG. 6)$=A(0.1P_s-(P_s-0.1P_s))=0.8P_s$, so more than doubling the working range of the bearing.

The apparatus shown in FIGS. 3 and 4 could of course be combined to give a bearing capable of withstanding high positive and negative loads and in which accuracy is ensured by small size pilot bearings while larger less accurately machined ones take most of the load. Various uses independent of fluid bearings can also be made of the flexible obstructions exemplified in FIGS. 1 to 4 and of the valves in which they are used.

I claim:

1. Apparatus including fluid-lubricated bearing means, said bearing means comprising a fluid-lubricated load-carrying bearing comprising two bearing members defining a clearance between them, a bearing recess formed in the first of these members, a source of fluid and a fluid line connecting this source to the recess whereby the fluid may issue from the recess into the clearance, a chamber, flexible obstruction means comprising a flexible obstruction spanning the chamber, the obstruction having two opposed faces and making fluid-tight engagement with the walls of the chamber to prevent fluid from passing from one face to the other face thereof and being mounted to flex relative to the chamber in directions normal to its two faces, said chamber being incorporated in said line so that substantially the whole of one of the two opposed faces of the obstruction is exposed to fluid at the pressure of that in the recess so as to move upon changes in recess pressure, the apparatus comprising also a variable orifice in the fluid line controlled by movement of said flexible obstruction, through which orifice all fluid must pass in moving from said source to said recess, the fluid upstream of the orifice being substantially at source pressure and that downstream substantially at recess pressure, said obstruction and orifice being interconnected so that variation in the setting of the obstruction varies the orifice, whereby movement of said obstruction upon changes in recess pressure varies the setting of the variable orifice, thus varying the flow of fluid to said recess to keep the clearance constant between the two bearing members.

2. Apparatus according to claim 1 wherein the relation between said obstruction and said orifice is such that flexing of the obstruction on increase of recess pressure relative to the load tends to close the orifice.

3. Apparatus according to claim 2 wherein said bearing means comprises a second fluid-lubricated bearing, and means for exposing the second of the two faces of the obstruction of the load-carrying bearing to the pressure at the recess of the second bearing, whereby the recess pressures of the two bearings tend to equalise.

4. Apparatus according to claim 3 in which the load-carrying bearing is a main load-carrying bearing and in which the recess of the second bearing is smaller and the surfaces of its members are more accurately machined than those of the load-carrying bearing.

5. Apparatus according to claim 1 wherein said flexible obstruction means comprises a second flexible obstruction similar to and mounted in common with the first so that variation of the setting of any of the two obstructions and the orifice varies the setting of the others, in which one of the faces of the second obstruction is exposed to source pressure so that recess and source pressures act in opposition upon the commonly mounted obstructions, in which the second face of the first obstruction is vented to exhaust, and in which the second face of the second obstruction is exposed to a volume of fluid, whereby the pressure created in this volume of fluid once the bearing attains equilibrium is equal to the difference between the source and recess pressures.

6. Apparatus according to claim 5 in which one of the bearing members is a slab with two parallel surfaces and the other includes a channel, the slab fitting within the channel so that each of the opposing walls of the channel registers with one of the parallel surfaces of the slab to define a clearance, one of these clearances being the bearing clearance, the other being in communication with the volume of fluid exposed to the second face of the second obstruction.

7. Apparatus according to claim 5 in which the variable orifice is defined in part by the second obstruction.

8. Apparatus according to claim 1 in which the relation between said obstruction and said orifice is such that flexing of the obstruction on increase of recess pressure relative to the load tends to open the orifice.

9. Apparatus according to claim 8 in which the fluid line includes a length of cylindrical conduit, in which the fluid from the source reaches the variable orifice by way of this conduit, and in which the orifice is the gap defined between the end of this length of conduit and the first face of the obstruction.

10. Apparatus according to claim 8 in which the fluid line includes a length of cylindrical conduit passing through the obstruction and mounted on it so as to move when the obstruction flexes, in which fluid from the source reaches the orifice by way of this conduit, and having a surface lying normal to axis of the conduit and close to its end, the orifice being the gap defined between the end of the length of conduit and this surface.

11. Apparatus according to claim 1 in which the obstruction is a diaphragm held at its periphery to the walls of the chamber.

12. Apparatus according to claim 1 in which the obstruction comprises a rigid disc and a resilient seal separating the periphery of the disc from the chamber wall, in which disc, seal and wall make tight contact so that operative movements of the disc relative to the wall shears the seal without rolling it.

13. Apparatus according to claim 12 in which the seal is an O-ring.

14. Apparatus including a fluid-lubricated load-carrying bearing comprising two bearing members defining a clearance between them, a bearing recess formed in the first of these members, a source of fluid, a fluid line connecting this source to the recess whereby the fluid may issue from the recess in the clearance, a chamber, a flexible obstruction spanning said chamber in a fluid-tight manner to prevent fluid from passing from one face of the flexible obstruction to the other face thereof, said flexible obstruction being mounted to flex relative to the chamber in directions normal to the faces of the obstruction, said chamber being incorporated in said line so that substantially the whole of one of the faces of the flexible obstruction is exposed to fluid at the pressure of that in the recess so as to move upon changes in recess pressure, and means forming a variable orifice in said line controlled by the movement of said flexible obstruction, said orifice forming the sole path of communication between said fluid source and said recess, whereby movement of said obstruction upon changes in recess pressure varies the setting of the variable orifice, thus varying the flow of fluid to said recess to keep the clearance constant between the two bearing members.

References Cited by the Examiner

UNITED STATES PATENTS 2,884,282  4/1959  Sixsmith _____ 308—9

FOREIGN PATENTS 811,501  4/1937  France.
1,142,912  9/1957  France.

DAVID J. WILLIAMOWSKY, Primary Examiner.

ROBERT C. RIORDON, DON A. WAITE, Examiners.

L. L. JOHNSON, Assistant Examiner.